Patented Oct. 3, 1939

2,174,538

UNITED STATES PATENT OFFICE 2,174,538

POLYSTYROL COATING COMPOSITION

Sylvia M. Stoesser and Arnold R. Gabel, Midland, Mich., assignors to The Dow Chemical Company, Midland, Mich., a corporation of Michigan No Drawing. Application July 1, 1937,
Serial No. 151,547

5 Claims. (Cl. 260—36)

The present invention relates to compositions comprising polystyrene, and particularly to liquid compositions suitable for lacquers and the like.

Polystyrene is in many respects well suited for use in coating compositions. It is soluble in common hydrocarbon solvents and can be applied in fairly concentrated solutions as a colorless protective film on metal, wood, etc. However, films of polystyrene do not adhere firmly to metal surfaces and tend to crack badly or even pull loose when the metal is bent, and to become brittle and crack on ageing. Furthermore, such films are not wholly impervious to aqueous solutions; that is, metal objects, even though coated with polystyrene, tend to corrode when in contact with aqueous solutions of electrolytes.

We have now discovered that when certain salicylates of the type hereinafter described are incorporated as plasticizers in coating compositions comprising polystyrene, the plasticized polystyrene provides a strongly adherent protective finish for metals, etc., which exhibits little or no tendency to crack or pull loose and which is substantially impervious to aqueous solutions.

The invention, then, consists of the new polystyrene compositions hereinafter fully described and particularly pointed out in the claims.

In preparing polystyrene compositions in accordance with the invention we prefer to use the tough resinous material produced by the polymerization of styrene at temperatures not exceeding 160° C. or thereabouts. However, other forms of polymerized styrene may also be utilized.

The salicylic acid derivatives which may be employed as plasticizers for polystyrene in accordance with the invention are salicylates having the generic formula

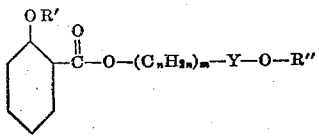

wherein R' is a hydrogen or alkyl radical, R" is an alkyl or alkoxy-alkyl radical, Y is a methylene or carbonyl radical, and m and n are integers. Examples of such salicylates are the following compounds; (ethylene glycol monoethylether)-salicylate; (diethylene glycol monoethylether)-salicylate; (ethyl lactate)-salicylate; (ethyl alpha-hydroxy-butyrate)-salicylate; (ethylene glycol monobutyl ether)-2-ethoxy benzoate; (ethylene glycol monoethyl ether)-2-methoxy-benzoate; (diethylene glycol monobutyl ether)-2-butoxy-benzoate; (propylene glycol mono normal propyl ether)-salicylate; (butylene glycol monomethyl ether)-salicylate, etc.

Although in preparing polystyrene coating compositions in accordance with the invention the proportions of polystyrene, plasticizer and solvent may be varied widely, in practice we prefer to dissolve one part by weight of polystyrene and 0.1–1.0 part, preferably 0.2–0.5 part, of a salicylate of the type hereinbefore described in 5 to 20 parts of a suitable thinner. As thinner any relatively volatile organic liquid in which both polystyrene and the plasticizer are soluble, e. g., benzene, toluene, xylene, ethylbenzene, etc., may be employed. Ordinarily a mixture of solvents of different boiling points is preferred. Instead of dissolving the polystyrene in the solvent the unpolymerized material may first be dissolved and thereafter polymerized in solution, the plasticizer being added either before or after polymerization.

The polystyrene lacquers just described are useful for application to metals, wood, etc., either on the bare surface or over a suitable undercoat, in any convenient way, such as by brushing, spraying, or dipping. They may, if desired, be modified by incorporating therein fillers, dyes, pigments, drying oils, other plasticizers, etc., to obtain varnishes and enamels of various types.

The following examples illustrate a number of ways in which the principle of the invention has been employed, but are not to be construed as limiting the scope thereof:—

Example 1

A lacquer having the following composition was prepared:

| | Parts by weight |
|---|---|
| Polystyrene | 7 |
| (Diethylene glycol mono-ethyl-ether)-salicylate | 3 |
| Benzene | 9 |
| Toluene | 54 |
| Ethylbenzene | 27 |

Clean metal strips were dipped in the lacquer, heated to 40°–60° C., after which they were removed, allowed to drain and then dried in an air bath at 65° C. When these coated metal strips were bent through a 180° angle over a ¼-inch rod and then back to their original flat position, the plasticized polystyrene films did not crack or break away from the metal surface. Also, when an acidic copper sulfate solution was placed on the coated metal test strips, there was no evidence of any action, even after two hours.

In contrast, when strips of metal dipped in a polystyrene lacquer containing no plasticizer were bent, the films cracked and in some instances pulled loose. Moreover, when such strips were tested with an acidic copper sulfate solution, as described above, bright metallic copper plated out on the metal surface within a few minutes.

*Example 2*

The following lacquer was prepared:

| | Parts by weight |
|---|---|
| Polystyrene | 9 |
| (Ethylene glycol monoethyl-ether)-salicylate | 1 |
| Benzene | 13.5 |
| Toluene | 36.0 |
| Xylene | 40.5 |

Metal test strips were dipped in the lacquer, dried, and tested as in Example 1. The polystyrene films did not crack or pull loose on bending and did not give evidence of any action on exposure to an acidic copper sulfate solution.

*Example 3*

The following lacquer was prepared:

| | Parts by weight |
|---|---|
| Polystyrene | 6 |
| (Ethyl lactate)-salicylate | 4 |
| Benzene | 9 |
| Toluene | 54 |
| Ethylbenzene | 27 |

Films prepared from this lacquer did not crack or pull loose on bending and had good corrosion resistance.

*Example 4*

A lacquer was prepared as in Example 3 except that (ethylene glycol monobutyl ether)-2-ethoxy benzoate was substituted for the plasticizer of Example 3. Films of this lacquer also showed no cracking or breaking on bending and had good corrosion resistance.

In addition to their use as plasticizers for polystyrene lacquers, salicylates of the type hereinbefore described may advantageously be employed in other polystyrene compositions, e. g., in cast or molded articles, to reduce the brittleness and improve the tensile strength thereof.

Other modes of applying the principle of our invention may be employed, change being made as regards the ingredients herein disclosed, provided the ingredients stated by any of the following claims or the equivalent of such stated ingredients be employed.

We therefore particularly point out and distinctly claim as our invention:

1. An organic plastic composition comprising polystyrene plasticized with a salicylate having the general formula

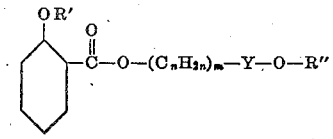

wherein R' is a radical selected from the group consisting of alkyl radicals and hydrogen, R'' is a radical selected from the group consisting of alkyl and alkoxy-alkyl radicals, Y is a radical selected from the group consisting of carbonyl and methylene radicals, and $m$ and $n$ are integers, to decrease the permeability and increase the adhesiveness thereof.

2. A coating composition comprising polystyrene plasticized with a salicylate having the generic formula

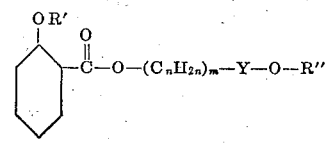

wherein R' is a radical selected from the group consisting of alkyl radicals and hydrogen, R'' is a radical selected from the group consisting of alkyl and alkoxy-alkyl radicals, Y is a radical selected from the group consisting of carbonyl and methylene radicals, and $m$ and $n$ are integers, and a solvent for the polystyrene.

3. A composition comprising polystyrene plasticized with (diethylene glycol monoethylether)-salicylate.

4. A composition comprising polystyrene plasticized with (ethyl lactate)-salicylate.

5. A composition comprising polystrene plasticized with (ethylene glycol monobutylether)-2-ethoxy-benzoate.

SYLVIA M. STOESSER.
ARNOLD R. GABEL.